United States Patent [19]

Stewart

[11] 3,852,816

[45] Dec. 3, 1974

[54] CARRIAGE ASSEMBLY FOR A VIDEO DISC PLAYBACK DECK

[75] Inventor: David S. Stewart, Palatine, Ill.

[73] Assignee: Zenith Radio Corporation, Chicago, Ill.

[22] Filed: Aug. 1, 1972

[21] Appl. No.: 277,074

[52] U.S. Cl. .......................... 360/86, 179/100.4 R

[51] Int. Cl. .......................................... G11b 5/52

[58] Field of Search.................. 274/23 A, 14, 4 H; 179/100.4 R, 100.1 DR; 360/13, 105, 106, 86, 87

[56] References Cited

UNITED STATES PATENTS

| | | | |
|---|---|---|---|
| 2,144,625 | 1/1939 | Herman | 179/6 TA |
| 2,200,351 | 5/1940 | Whitehead | 179/100.1 DR |
| 2,391,897 | 1/1946 | Harrington | 179/100.1 DR |
| 2,822,426 | 2/1958 | Dinsmore | 179/100.1 DR |
| 2,915,315 | 12/1959 | Rabinow | 274/23 A |
| 3,456,951 | 7/1969 | Rhoades | 274/21 |
| 3,622,163 | 11/1971 | Bachman | 274/23 A |

OTHER PUBLICATIONS

World Premier, video disc, Berlin 1970; pp. 20–21.

*Primary Examiner*—Bernard Konick
*Assistant Examiner*—Alan Faber
*Attorney, Agent, or Firm*—John J. Pederson; Cornelius J. O'Connor

[57] ABSTRACT

A carriage assembly for a video disc playback deck having a motor driven lead screw for advancing the pickup during playback, and a user actuated lead screw allowing manual positioning of the pickup. As the carriage is selectively pivoted into engagement with one of the two lead screws, the pickup is automatically extended or retracted from engagement with the disc. A novel automatic retraction feature is also provided to retract the pickup at the end of the video disc.

4 Claims, 8 Drawing Figures

CARRIAGE ASSEMBLY FOR A VIDEO DISC PLAYBACK DECK

BACKGROUND OF THE INVENTION

The present invention relates to disc playback systems, and more particularly to a carriage assembly for a video disc playback deck.

With recent increased emphasis on television for educational as well as entertainment purposes, a demand has arisen for an economical and efficient means for storing and playing back video programs. One particularly advantageous medium for this purpose is the vinyl disc, which is extremely economical to manufacture and which can be readily duplicated in large quantities by means of pressing operations similar to those employed for conventional phonograph records. The information density required of a vinyl disc to obtain reasonable picture resolution and color fidelity dictates an extremely finely grooved structure on the record surface. This precludes conventional pickup configurations where the disc grooves drive the stylus, because of the high tracking force required. The allowable tracking forces for a vodeo disc of the contemplated structure are extremely low, making the conventional tone arm, which tracks with a pressure generally in excess of 1 gram, completely unworkable.

An arrangement where the pickup is carried by a carriage driven across the surface of the disc eliminates the need for disc exerted tracking forces and it is to the construction of such a pickup carriage that the present invention is directed.

SUMMARY OF THE INVENTION

Accordingly, it is a general object of the present invention to provide a novel carriage assembly for a video disc pickup.

It is a more specific object of the present invention to provide a novel carriage assembly for a video disc playback deck which permits both automatic advancement and manual positioning of the pickup.

The invention is directed to a carriage assembly for advancing a pickup over a rotating information storage disc of the type having at least one surface containing a spiral-form modulation track. The assembly comprises a carriage for supporting the pickup above the surface of the disc, a carriage frame including first and second end plates, and means comprising a carriage support element extending between the end plates, the pickup carriage being slidably mounted thereon and constrained thereby to motion along a defined path between the end plates and parallel to the surface of the disc. A motor driven lead screw disposed between the end plates and parallel to the path defined for the pickup carriage is provided, as is a user-actuated lead screw disposed between the end plates and parallel to the path defined by the pickup carriage. Selection means are provided for engaging the carriage with either the motor-driven lead screw to automatically advance the pickup across the surface of the disc at a rate equal to the progression of the spiral-form modulation track across the disc, or with the user-actuated lead screw to permit the pickup to be manually positioned over a desired location along the spiral-form modulation track for subsequent engagement with the track.

BRIEF DESCRIPTION OF THE DRAWINGS

The features of the present invention which are believed to be novel are set forth with particularity in the appended claims, and the invention, together with further objects and advantages thereof, may be understood by reference to the following description taken in connection with the accompanying drawings, in which:

Figures 1, 4, 5:
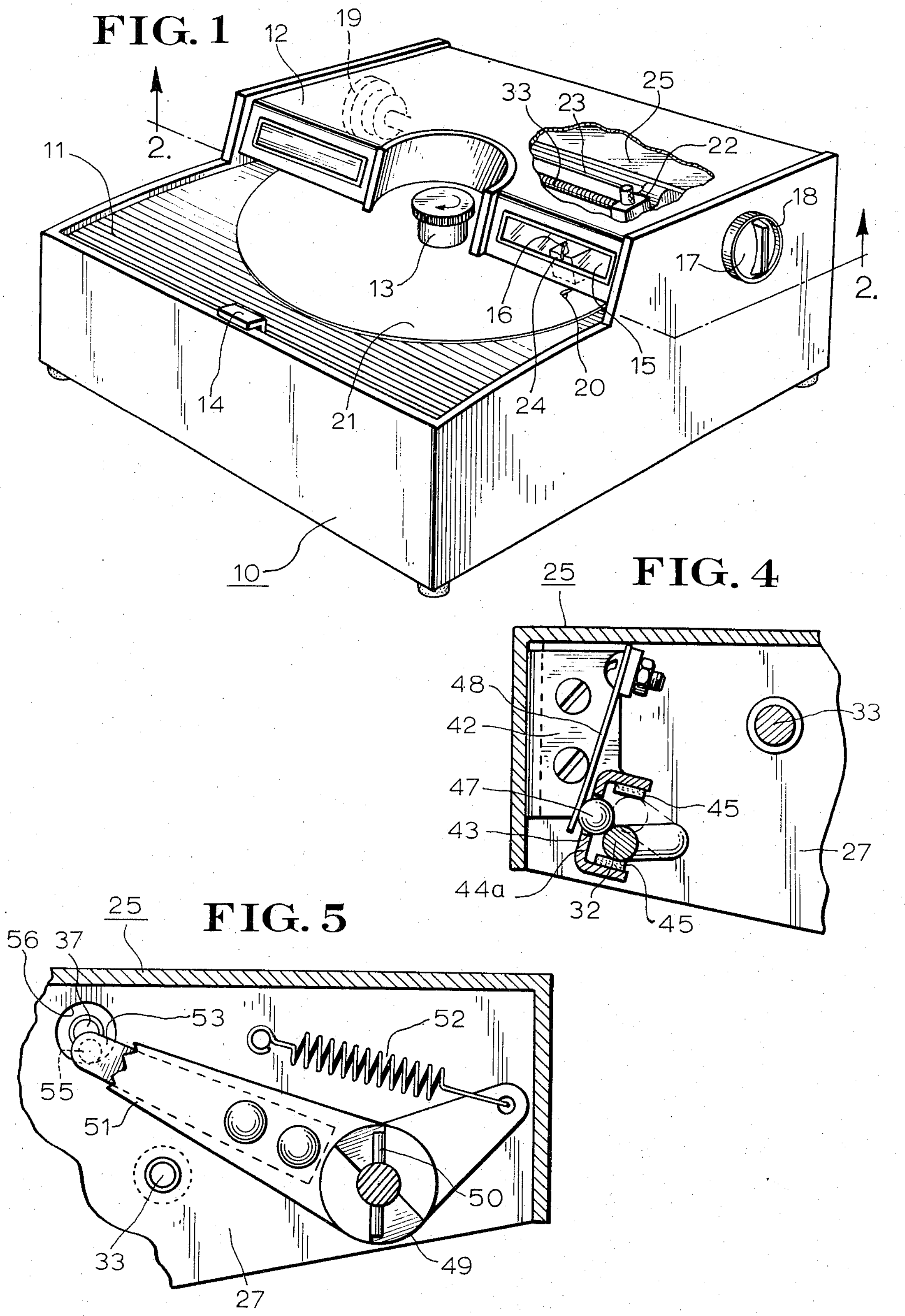
FIG. 1 is a perspective view of a video disc playback deck incorporating the present invention.
Figure 2:
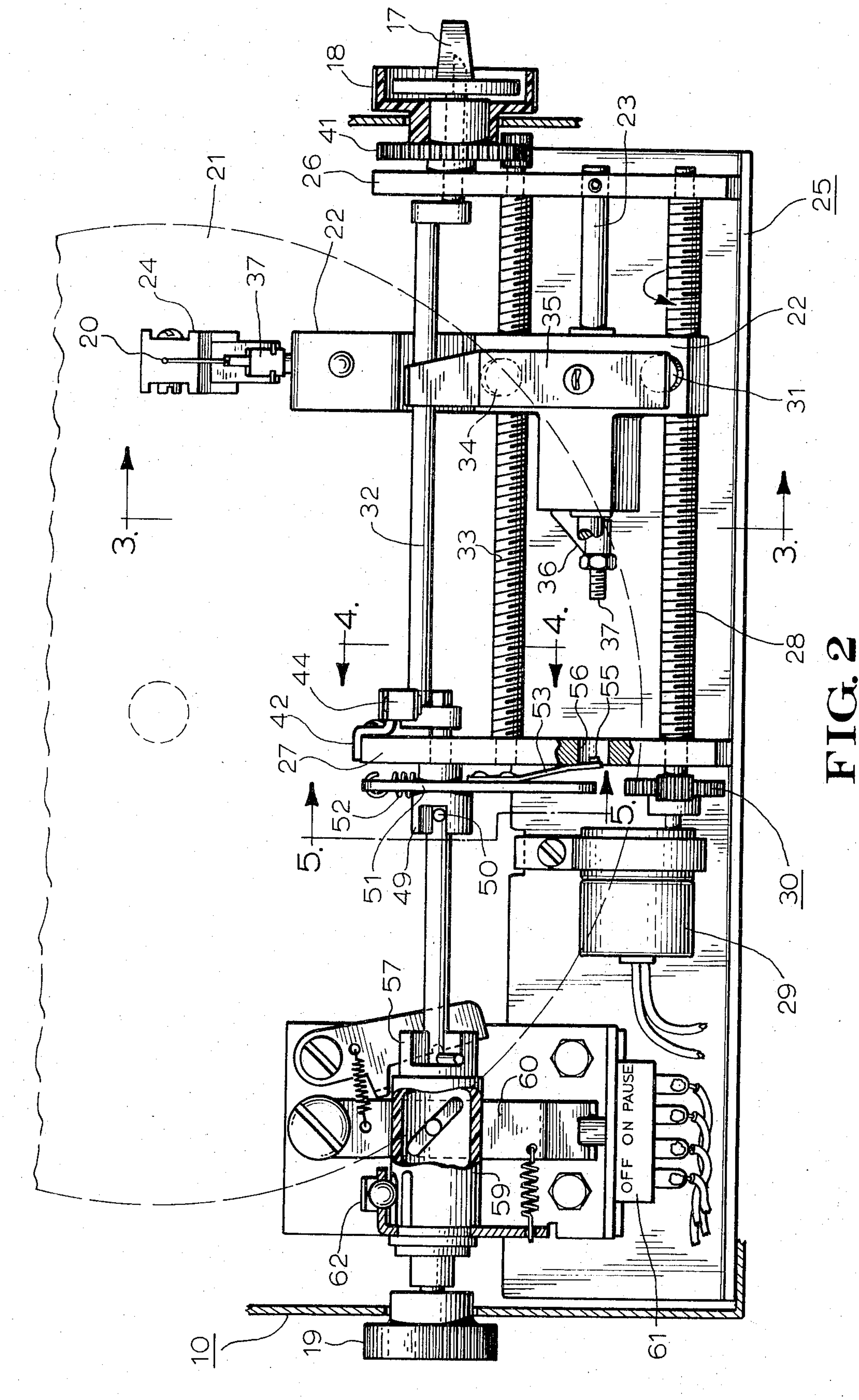
FIG. 2 is an underside plan view of the novel pickup carriage assembly of the invention.
Figure 3:
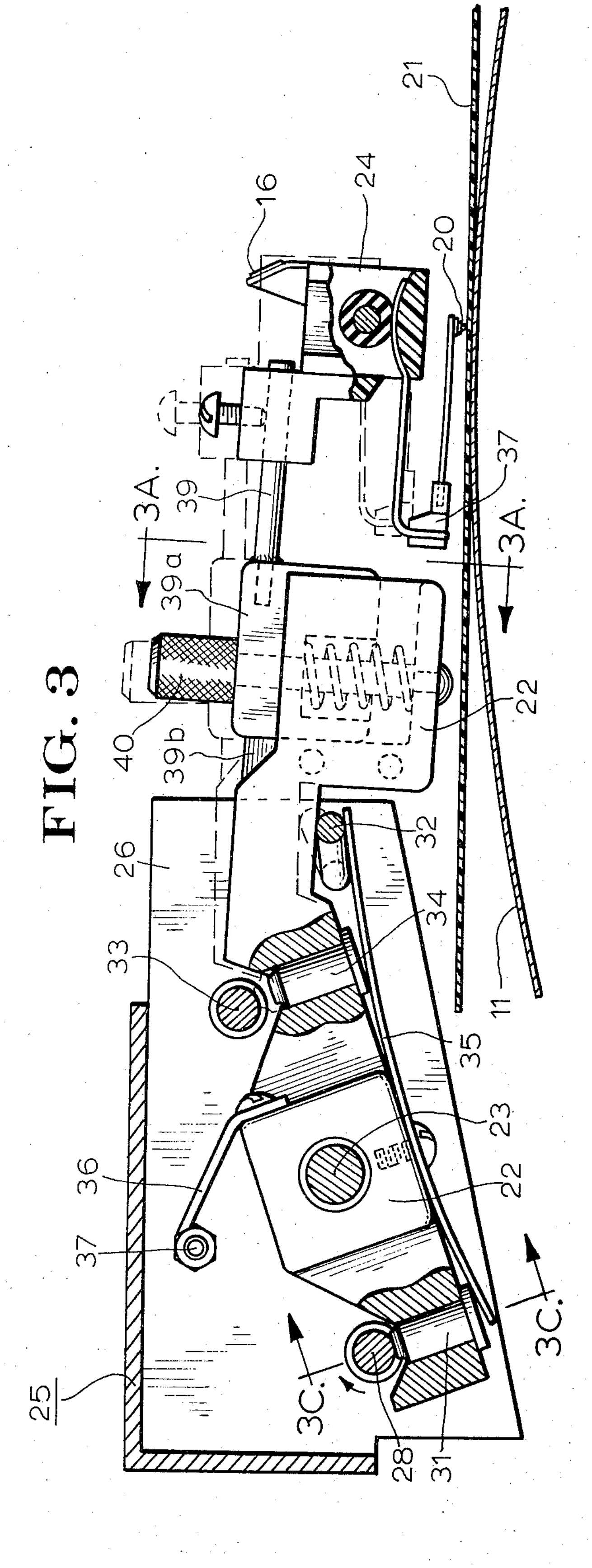
FIG. 3 is a cross-sectional view, taken along lines 3—3 of FIG. 2, of the carriage assembly of the invention.

FIGS. *3a–3c* are detailed sectional views of the carriage assembly of FIG. 3, as indicated;

FIG. 4 is a cross-sectional view of the carriage lifter shaft detent mechanism taken along lines 4—4 of FIG. 2; and FIG. 5 is a cross-sectional view of the carriage end-of-play automatic retraction assembly taken along lines 5—5 of FIG. 2.

DESCRIPTION OF THE PREFERRED EMBODIMENT

Referring to FIG. 1, the pickup carriage assembly of the invention is shown in the embodiment of a video disc playback deck. The playback deck comprises a housing 10 having a deck portion 11 and a cover 12 partially overlying the deck. There is no turntable as such, but instead a rotating hub 13, to which the thin vinyl discs for which the playback deck is designed are attached. The hub turns at a sufficiently high rate of speed, in practice on the order of 1800 RPM, to cause the vinyl disc to fly, i.e., leave the deck surface and suspend itself on a cushion of air. To aid this phenomenon, the deck may be curved away from the hub as shown in FIG. 3. A combination brake and disc lift control 14 is provided to facilitate removal of dics by bringing the spinning hub to an abrupt stop and lifting the edge of the disc nearest the operator away from the deck surface.

The combination disc lift control and motor brake is the subject of a separate application in the name of David S. Stewart and Charles R. Pedersen, Ser. No. 277,029, filed, Aug. 1, 1972 and assigned to the same assignee of the present invention now U.S. Pat. No. 3,803,351.

A window 15 contained in the front lip of the deck lid serves, in conjunction with a pointer 16, to indicate the position of the pickup relative to a disc. A stylus raise-lower control 17 is contained on the right side of the housing to accomplish engagement and disengagement of the pickup from the disc in a manner to be presently explained. A manual positioning control 18, concentric with stylus raise-lower control 17, permits the stylus to be accurately positioned over a desired location on the disc in a manner which will also be fully explained. The left side of housing 10 contains a mode selection control 19, which enables operator selection of off-on and pause modes. The switch is interlocked with the stylus raise-lower control 17 to assure that the stylus will be retracted from the disc during insertion and removal of discs and during storage of the playback deck.

Referring now to FIG. 2, an underside plan view of the novel carriage assembly is shown for positioning a pickup in the form of a stylus 20 and for tracking it across the fine grooves of an underlying vinyl disc 21. Since this is an underside view, disc 21 is indicated in outline form only. In this case stylus 20 is a diamond stylus with a very small radius, and it is in preventing damage to such small stylii that the invention is most useful. However, it will be appreciated that the invention also finds utility with other types of pickups, such as the electrostatic type wherein close or proximate contact is desired with minimum tracking forces. Disc 21 contains video information on an information track consisting of fine surface grooves cut in the form of a spiral on its surface. The exact nature by which information is recorded in these grooves, while not of direct bearing on this invention, may basically be thought of as a carrier frequency-modulated by video and impressed on the disc as a series of binary depressions. The stylus tracks the groove formed by these depressions with just enough pressure to sense the binary information, and it remains for the carriage to control the lateral movement of the stylus as the information track progresses from the outside rim to the hub of the disc. In practice, the grooves are recorded with a run-out of less than 0.003 inches on a very thin vinyl disc. The diamond stylus is directly connected to a piezoelectric-type transducer which is resiliently mounted to allow minor tracking errors to be accommodated.

Various signal processing systems have been proposed for "compressing" the video information to improve picture resolution and color fidelity. A system useful with the present invention is that described and claimed in the copending application of Howard Jirka, Ser. No. 319,107, filed Dec. 27, 1972, which is also assigned to the present assignee. Of course, the present invention finds utility with any workable information system, and is not restricted to the aforementioned video system.

Stylus 20 is carried above disc 21 by a carriage 22, which is constrained by a carriage support element, in the form of a guide rod 23, to reciprocal movement along a path above and parallel to the surface of disc 21. Preferably, this path is such that stylus 20 contacts the surface of disc 21 tangentially to the spiral-form grooves on the surface of the disc, with its head incident thereto at an optimum tracking angle. In this regard, a limited degree of adjustment is provided by the stylus mounting head 24. Guide rod 23 is fastened to a carriage frame 25, which comprises two upstanding equi-spaced end plates, one plate 26 near the outside edge of the disc and another plate 27 near the inside hub.

During normal playback operation the carriage is advanced along the path defined by guide rod 23 by means of a lead screw 28, which is driven at a constant rate by a cross-feed carriage drive motor 29. Motor 29, which may be a conventional AC synchromous motor of the type commonly employed in timing apparatus, is connected to operate whenever the stylus engages the disc when the mode switch is in the on position. A gear reduction train 30 is provided to obtain the exact stylus feed rate required for accurate tracking. In practice, the driving force for carriage 22 is transmitted by a follower 31, carried on the carriage, and engageable with lead screw 28. The follower is kept in contact with the lead screw by means of a carriage lifter shaft 32, and a follower retention spring 35. Carriage lifter shaft 32 is pivotably mounted to end plates 26 and 27 at an offset to its axis, so that as it is partially rotated, it in effect forms a cam surface extending along the entire path of carriage 22.

To permit rapid and convenient positioning of the stylus along the disc, a user-actuated lead screw 33 is provided. In accordance with one aspect of the invention, this lead screw is positioned on the stylus side of and parallel to guide rod 23 so that carriage 22 can be pivoted about guide rod 23 and into engagement with either it or lead screw 28. A follower 34, provided on carriage 22, is engageable with lead screw 33 for transmitting the necessary driving force from this lead screw, which preferably, but not necessarily, has a faster pitch than lead screw 28 for allowing quick positioning of the carriage to the desired location.

Figure 3A:
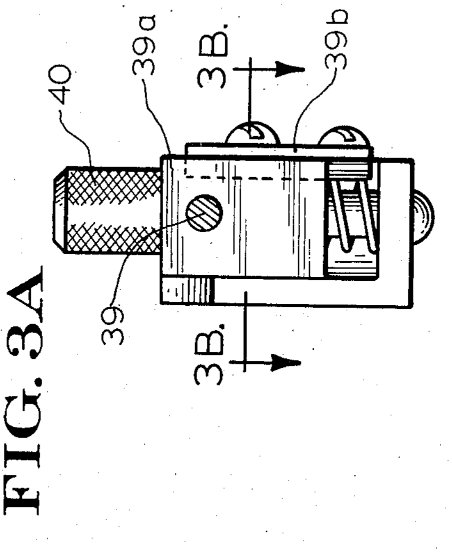
Figure 3B:
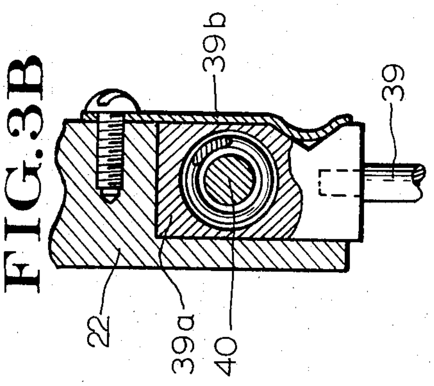
Figure 3C:
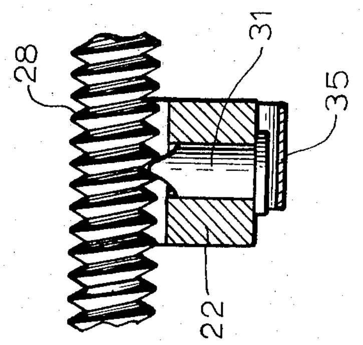

Details of the follower arrangement are best seen in FIG. 3*c*. Followers 31 and 34 are identical and the comments relative to follower 31 apply to follower 34. Follower 31 is generally cylindrical with a cap portion 31*b* forming a shoulder adapted for abutting relationship with carriage 22. Its other end is substantially V-shaped for engagement with the threads of lead screw 28. Spring 35 urges cap portion 31b into contact with carriage 22. Since the follower is free to rotate within the carriage, it is free to "track" the grooves in the lead screw and thus automatically adjust itself to the pitch of the screw thread. This simple arrangement eliminates the necessity of providing for precise orientation between the followers and lead screws, which otherwise poses severe problems because the followers must be disengageable.

Reference is now made to FIG. 3, wherein the structure of the carriage is shown in cross-section. There it is seen that carriage 22 is also coupled to lifter shaft 32 by means of follower retention spring 35, which comprises an appropriately shaped length of spring steel fastened to the carriage with machine screws. The followers 34 and 31 are also shown, as is a mounting bracket 36 for a release pin 37, the functioning of which will be presently explained. Further, as best seen in FIGS. 3*a* and 3*b*, the mounting arrangement for stylus 20 comprises a block 37 of resilient material and mounting head 24. Stylus 20, block 37 and mounting head 24 are all carried at a predetermined spacing from carriage 22 by a spacer rod 39. Mounting head 24 is secured to spacer rod 39 by a machine screw or other appropriate means. Spacer rod 39 is attached to an adjustment block 39*a* which is frictionally secured within an appropriately shaped socket on carriage 22 by means of a spring loaded thumb screw 40. A flat spring 39*b* provides lateral force on adjustment block 39*a* which is vertically adjustable by operation of the thumb screw.

Lead screw 33 is rotationally coupled to the useractuated stylus positioning control 18 by means of a gear train 41. Lifter shaft 32 extends through end plate 26 and manual stylus positioning control 18 to connect with stylus raise-lower control 17. Lifter shaft 32 is detented into its stylus extended and retracted positions by means of a ball-bearing and spring assembly located on the inside face of end wall 27. While this assembly may take a number of alternate forms, that shown in the present embodiment has proven reliable and economical to construct.

Referring to FIG. 4, the detent mechanism is seen to comprise a bracket 42 having an upstanding U-shaped portion 44*a* containing a hole 43. A ball-bearing 47 is captivated within the hole and forced against lifter shaft 32 by spring 48 suitably fastened at its other end to bracket 42. The desired detent action is obtained as lifter shaft 32 is rotated about its rotational axis established by end plate 27 since it can only assume stable positions in U portion 44 on either side of ball-bearing 47. Bumper pads 45 are provided for cushioning.

In accordance with another aspect of the invention, means are provided in the form of a spring-powered rotary actuator for returning lifter shaft 32 to its stylus-retracted position when carriage 22 reaches the end of travel. Specifically, and with referece to FIG. 5, the rotary actuator comprises a collar portion 49 concentrically mounted on the rotational axis of lifter shaft 32. The collar is provided with two opposed, recessed wedge-shaped cam segments disposed to receive a pin 50 radially extending from shaft 32. This arrangement allows shaft 32 a predetermined degree of rotational freedom before pin 50 comes into contact with the cam segments. Actuator 49 is biased in a counterclockwise direction by means of a radially extending actuator arm 51 and an associated coil spring 52. A release member 53 is attached to actuator arm 51 by a pair of rivets or the like and includes a bent over portion 55 engageable with a hole 56 in end plate 27. Release member 53 is preferably of spring steel and is biased such that bent over portion 55 rides against the surface of end plate 27 and indexes in hole 56. When the actuator is turned clockwise to the point where bent over portion 55 falls into hole 56, the actuator is biased for counterclockwise movement. When release pin 37 on carriage 22 pushes bent over portion 55 out of hole 56, coil spring 52 rotates actuator 49 counterclockwise. This occurs when carriage 22 reaches the end of its travel. The cam segments push against pin 50 and rotate lifter shaft 32 into its stylus-retracted position. Thus, the stylus is automatically retracted when carriage 22 reaches the end of travel. Release pin 37 may be threaded in a bracket 36 mounted on carriage 22 to facilitate adjustments in end of travel limits.

The pivotal axis of lifter shaft 32 is extended beyond end wall 27 and into alignment with a second rotary actuator 57. This actuator, like actuator 49, contains a pair of opposed, recessed wedge-shaped cam segments accommodating another radially extending pin 58 on shaft 32. Actuator 57 is rotationally coupled to mode control 19 to force lifter shaft 32 into its stylus-retracted position when the mode control is rotated counterclockwise into the off position, thus assuring stylus retraction when the deck is not in use. An actuator drum 59 also coupled to control 19 provides appropriate cam surfaces for actuating a lever 60 which operates slide switch 61. Switch 61 controls application of power to the electronic portions of the deck as well as motor 29 which is de-energized when mode control 19 is in its pause position. When switch 61 is in its off position, all power flow to the deck is terminated. An additional spring-biased detent arm 62 is provided to positively index the mode control into its three operating positions.

Thus, a novel carriage assembly for a video disc playback deck or other application wherein a stylus must be tracked across a spiral-grooved disc with extremely low tracking forces, has been shown and described. The assembly, while being economical to construct and requiring a minimum number of components, does not sacrifice the precision necessary in a video disc playback apparatus of the type illustrated. Furthermore, the device is extremely convenient to use and provides high desirable safeguards against accidental damage to either the stylus or disc.

While particular embodiments of the invention have been shown and described, it will be obvious to those skilled in the art that changes and modifications may be made thereto without departing from the invention in its broader aspects, and therefore, the aim in the appended claims is to cover all such changes and modifications as fall within the true spirit and scope of the invention.

What is claimed is:

1. A carriage assembly for advancing a pickup element over an independently driven rotating information storage disc containing a spiral modulation track comprising: a carriage supporting said pickup element adjacent the surface of said disc;

a frame;

carriage support means for supporting said carriage on said frame for travel along a path parallel to the surface of said disc;

motor driven carriage advancing means comprising a first lead screw rotatably journalled on said frame for rotation about an axis parallel to said carriage travel path for propelling said pickup element across the surface of said disc at a velocity proportional to the radial progression of the rotating spiral track;

user actuated carriage positioning means comprising a rotatable control and a second lead screw also rotatably journalled on said frame for rotation about an axis parallel to said carriage travel path for manually positioning said pickup to a desired location along said spiral track in response to rotation of said control;

selector means coupled to said carriage for selectively engaging said carriage with either said motor driven lead screw or said user actuated lead screw;

first and second followers individually engageable, respectively, with said carriage advancing lead screw and said carriage positioning lead screw; and means for pivotally mounting said carriage on said carriage support means for displacement, in response to actuation of said selector, between an operating position in which said first follower engages said carriage advancing lead screw and said pickup is presented to said track for sensing modulation thereon, and a retracted position in which said second follower engages said carriage positioning lead screw as said pickup is withdrawn from presentation to said track.

2. A carriage assembly as described in claim 1, wherein said spiral modulation track is contained within and annular band on said disc having a predetermined minimum inside radius;

and in which said selector means includes a lifter for displacing, and releasably securing, said carriage between said operating and retracted positions and retracting means coupled to said lifter for automatically displacing said carriage to said retracted position when said pickup element overlies a point corresponding to said predetermined minimum radius.

3. A carriage assembly as described in claim 2 which further includes an adjustable carriage-borne actuator;

and in which said retracting means comprises a spring loaded trigger coupled to said lifter and releasable by said carriage borne actuator, when said actuator arrives at a location corresponding to said predetermined minimum radius, to displace said carriage into said retracted position.

4. A carriage assembly as described in claim 1 wherein said followers comprise cylindrical members each having a substantially V-shaped extremity for engagement with the threads of its assigned lead screw;

and said carriage comprises substantially cylindrical receptacles individually rotatably receiving said follower members thereby permitting said V-shaped extremities to continually align themselves with said lead screw threads.

* * * * *